(12) United States Patent
Kim et al.

(10) Patent No.: US 8,501,835 B2
(45) Date of Patent: Aug. 6, 2013

(54) INK COMPOSITION FOR ROLL PRINTING

(75) Inventors: Dae Hyun Kim, Daejeon (KR); JinWoo Cho, Daejeon (KR); Dong Myung Shin, Daejeon (KR); Ji Su Kim, Daejeon (KR); Min Young Lim, Seongnam-si (KR); Sung Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 208 days.

(21) Appl. No.: 12/448,724

(22) PCT Filed: Aug. 27, 2008

(86) PCT No.: PCT/KR2008/005005
§ 371 (c)(1),
(2), (4) Date: Oct. 8, 2009

(87) PCT Pub. No.: WO2009/061066
PCT Pub. Date: May 14, 2009

(65) Prior Publication Data
US 2011/0244196 A1 Oct. 6, 2011

(30) Foreign Application Priority Data
Nov. 5, 2007 (KR) .......... 10-2007-0111906

(51) Int. Cl.
*C09D 11/00* (2006.01)
(52) U.S. Cl.
USPC ..... 523/160; 523/161; 428/195.1; 106/31.13; 524/1; 524/560
(58) Field of Classification Search
USPC ............................ 523/160, 161
See application file for complete search history.

(56) References Cited

U.S. PATENT DOCUMENTS

| | | | |
|---|---|---|---|
| 6,517,980 B2* | 2/2003 | Ueda et al. | 430/14 |
| 2002/0102480 A1* | 8/2002 | Washizu et al. | 430/7 |
| 2002/0117080 A1 | 8/2002 | Okutsu et al. | |
| 2002/0128351 A1* | 9/2002 | Kiguchi et al. | 523/161 |
| 2003/0119943 A1* | 6/2003 | Tucker et al. | 523/160 |
| 2005/0188894 A1 | 9/2005 | Yamagishi et al. | |
| 2007/0251414 A1 | 11/2007 | Ueno et al. | |
| 2008/0030560 A1* | 2/2008 | Martin et al. | 347/100 |

FOREIGN PATENT DOCUMENTS

| | | |
|---|---|---|
| JP | 10-104825 | 4/1998 |
| JP | 2001-220396 | 8/2001 |
| JP | 2002-250812 | 9/2002 |
| JP | 2003-514060 | 4/2003 |
| JP | 2005-133010 | 5/2005 |
| JP | 2005-325350 | 11/2005 |
| JP | 2006-232867 | 9/2006 |
| JP | 2007-177200 | 7/2007 |
| JP | 2007-197599 | 8/2007 |
| JP | 2008-143977 | 6/2008 |
| KR | 10-2007-0023634 A | 2/2007 |
| TW | 542924 | 7/2003 |
| WO | WO 01/32789 | 5/2001 |
| WO | WO 2006/093398 | 9/2006 |

* cited by examiner

*Primary Examiner* — Doris Lee
(74) *Attorney, Agent, or Firm* — McKenna Long & Aldridge, LLP

(57) ABSTRACT

An ink composition for roll printing is provided. The ink composition uses a solvent system having an evaporation rate $(V_r)$ of at least 0.1 mg/cm$^2$·min and an absorption rate $(S_r)$ into a blanket of less than 3.412 mg/cm$^2$·min. The use of the highly volatile solvent system can minimize swelling of the blanket without impairing the dispersibility of a pigment in the ink composition. Therefore, the uniformity of a pattern formed using the ink composition can be maintained and the formation of defects by the solvent system can be minimized.

14 Claims, No Drawings

INK COMPOSITION FOR ROLL PRINTING

This application is a 35 U.S.C. §371 National Stage entry of International Application No. PCT/KR2008/005005, filed on Aug. 27, 2008, and claims the benefit of Korean Patent Application No. 10-2007-0111906 filed on Nov. 5, 2007, both of which are incorporated herein by reference in its entirety.

TECHNICAL FIELD

The present invention relates to an ink composition for roll printing that uses a highly volatile solvent system to minimize swelling of a blanket so that a uniform pattern can be obtained.

BACKGROUND ART

Fine patterns used in the fabrication of semiconductor circuit devices and display devices, such as LCDs and PDPs, are formed by photolithography using photoresists. Photolithography has an advantage in that desired patterns can be precisely obtained, but is disadvantageous in that a number of processing steps are involved, many kinds of materials are used to maximize the effects of photoresists and large amounts of photoresists are consumed during coating process.

In an effort to overcome such disadvantages of photolithography, patterning for the formation of fine patterns by roll printing or inkjet printing has been proposed as a next-generation technique.

Various roll printing methods such as offset printing, reverse offset printing and roll-to-roll printing can be applied to the formation of fine patterns. Such roll printing methods are widely applicable to the fabrication of display devices, for example, the formation of red (R), green (G), blue (B) and black matrix (BM) patterns as constituent elements of color filters, and the formation of electrode patterns and the transfer of barrier rib patterns for the fabrication of thin film transistors (TFTs) and plasma display panels (PDPs).

According to reverse offset printing as a representative roll printing method, a desired pattern is formed by the three-step procedure: coating of an ink on a blanket using a coater, transfer of unwanted portions of a pattern from the blanket to a cliché, and transfer of desired portions of the pattern remaining on the blanket to a glass substrate. A typical roll printing system includes a coater, a roll, a roll driver, a cliché or substrate stage, and a stage alignment driver as essential elements. The roll printing system may further include a cliché and/or pipe cleaner, a drier for evaporating a solvent absorbed into the blanket to dry the blanket, and a variety of sensors as optional elements.

The precision and transfer of the pattern formed by the roll printing method are largely dependent on various processing conditions, for example, the state of the ink coated on the blanket of the roll using the coater, the degree of evaporation and waiting time of the solvent until the pattern is transferred to the cliché or the substrate after coating, and the printing pressure produced by an interval between the stage and the blanket during transfer.

Particularly, the coating state of the ink on the blanket in the first step of the roll printing method is a factor determining the formation of defects in various forms as well as the uniformity of the entire pattern. At this time, the solvent contained in the ink is absorbed into the blanket and swells the blanket to cause a variation in the thickness of the blanket, which has a great influence on the transfer of the pattern by the roll printing method. Slow volatilization of the solvent contained in the ink increases the waiting time taken until the solvent is evaporated after coating of the ink on the blanket, causing not only an increase in processing time but also an increase in the time when the coated ink is in contact with the blanket. As a result, swelling of the blanket due to the solvent absorption becomes more severe.

Therefore, a solvent used in the preparation of an ink is required to be volatile upon transfer of a fine pattern by roll printing while minimizing swelling of a blanket. In addition, a solvent used in the preparation of an ink for roll printing must not impair the dispersibility of a pigment.

DISCLOSURE

Technical Problem

Thus, the present inventors have earnestly and intensively conducted research to solve the problems of the prior art ink compositions for roll printing. As a result, the present inventors have found that when a solvent system that meets specific evaporation rate and absorption rate criteria was selected and used to prepare an ink composition for roll printing, swelling of a blanket was minimized without impairing the dispersibility of a pigment in the ink composition. The present invention has been achieved based on these findings.

An object of the present invention is to provide an ink composition for roll printing which comprises a highly volatile solvent system to minimize swelling of a blanket.

Another object of the present invention is to provide a red, green or blue pattern as a color pattern formed using the ink composition.

Another object of the present invention is to provide a black matrix pattern formed using the ink composition.

Still another object of the present invention is to provide a display device comprising the color pattern and the black matrix pattern.

Technical Solution

According to the present invention, the above and other objects can be accomplished by the provision of an ink composition for roll printing using a solvent system that meets specific evaporation rate and absorption rate criteria.

Advantageous Effects

The ink composition of the present invention uses a solvent system that meets specific evaporation rate and absorption rate criteria to enable the formation of a precise pattern by roll printing, increase the transfer efficiency of a pattern, and minimize swelling of a blanket.

BEST MODE

Preferred embodiments of the present invention will now be described in greater detail.

The present invention provides an ink composition for roll printing comprising a binder resin, a colorant, a polyfunctional monomer having at least one ethylenically unsaturated double bond, an initiator, a solvent system and at least one additive wherein the solvent system meets specific evaporation rate and absorption rate criteria.

In a particular embodiment, the solvent system has an evaporation rate ($V_r$) of at least 0.1 mg/cm$^2$·min and an absorption rate ($S_t$) into a blanket of less than 3.412 mg/cm²·min, as calculated by Equations 1 and 2, respectively:

$$V_t = \frac{W_t}{A \times t} \quad (1)$$

where $W_t$ is the weight loss (mg) of the solvent system, A is the area of a glass dish, and t is the time (min) when the solvent system is left in air; and $$S_t = \frac{W_t - W_0}{A_0 \times t} \quad (2)$$

where $W_o$ and $W_t$ are the initial and final weights of a polydimethylsiloxane (PDMS) rubber layer measured before and after the PDMS rubber layer is dipped in the solvent system for a given time (t), respectively, $A_o$ is the initial surface area of the PDMS rubber layer, and t is the dipping time of the PDMS rubber layer.

Specifically, the evaporation rate of a solvent is calculated by placing 5 g of the solvent on a glass dish with a diameter of 10 cm, allowing the solvent to stand in air under ambient conditions (23° C., 45% R.H.), measuring the weight loss of the solvent due to evaporation with the passage of time, and expressing the weight of the solvent evaporated per unit area and time by Equation 1. The evaporation rates of various solvents are shown in Table 1.

The absorption rate of a solvent into a blanket is calculated by weighing a polydimethylsiloxane (PDMS) rubber layer (length:width:thickness=5 cm:1 cm:300 μm), dipping the rubber layer in 30 g of the solvent for a given time, taking the rubber layer out of the solvent, measuring the weight of the PDMS rubber layer after the dipping, and calculating the difference in the weight of the rubber layer. The absorption rates of various solvents are shown in Table 1.

TABLE 1

| Solvent | $V_t$ (mg/cm² · min) | $S_t$ (mg/cm² · min) |
|---|---|---|
| Methyl ethyl ketone | 1.23 | 7.055 |
| Ethyl acetate | 1.563 | 12.129 |
| Propylene glycol monomethyl ether acetate | 0.1 | 3.412 |
| Acetone | 2.915 | 2.915 |
| 1-Methoxy-2-propanol | 0.175 | 0.841 |
| 1-Ethyoxy-2-propanol | 0.092 | 2.37 |
| Isopropyl acetate | 0.996 | 12.354 |
| Cyclohexanone | 0.09 | 2.028 |
| Dipropylene glycol monomethyl ether | 0.01 | 0.949 |
| 3-Methoxy butyl acetate | 0.02 | 3.377 |
| Dimethyl carbonate | 0.751 | 0.887 |

As mentioned above, a solvent for use in the preparation of an ink for roll printing must be highly volatile while minimizing swelling of a blanket when a fine pattern is transferred by roll printing.

Propylene glycol monomethyl ether acetate (PGMEA) is a general-purpose solvent used in the production of electronic materials. PGMEA has an evaporation rate of 0.1 mg/cm²·min and an absorption rate into a blanket of 3.412 mg/cm²·min, as shown in Table 1.

Therefore, in order for a solvent to be used in an ink composition for roll printing, it would be desirable that the solvent has an evaporation rate higher than and an absorption rate lower than those of PGMEA.

Specifically, the solvent system used in the ink composition of the present invention has an evaporation rate ($V_t$) of at least 0.1 mg/cm²·min and an absorption rate ($S_t$) of less than 3.412 mg/cm²·min, as calculated by Equations 1 and 2, respectively.

Examples of solvent systems suitable for use in the present invention include a mixture of two or more selected from the group consisting of propylene glycol monomethyl ether acetate, acetone, 1-methoxy-2-propanol, 1-ethoxy-2-propanol, cyclohexanone, and dimethyl carbonate.

Taking into consideration the fact that the ink composition of the present invention can produce various colors, there can also be used a solvent that fails to meet the evaporation rate and absorption rate criteria defined above. In this case, effects of the present invention can be attained when the solvent is present within a particular content range.

In other words, even when a solvent having an evaporation rate of less than 0.1 mg/cm²·min, as calculated by Equation 1, or a solvent having an absorption rate of 3.412 mg/cm²·min or higher, as calculated by Equation 2, is used, effects of the present invention can be accomplished. In this case, the solvent can be present in an amount of 30% by weight or less with respect to the total weight of all solvents.

The solvent system is preferably present in an amount of 50 to 90% by weight, based on the total weight of the ink composition for roll printing. If the solvent system is used in an amount of less than 50% by weight, the solids contents of the final ink are too high, which causes poor coatability when the ink is coated on the blanket surface using a coater. This poor coatability makes it difficult to form a uniform coating film on the blanket surface. Meanwhile, the use of the solvent system in an amount of more than 90% by weight results in an increase in the waiting time required for the transfer of a pattern to a substrate after coating of the ink on the blanket, which may cause severe swelling of the blanket by the solvent system.

Examples of red pigments that can be used to create desired color characteristics in the ink composition of the present invention include: naphthol red pigments, such as Pig.Red #1 (C.I.12070), Pig.Red #2 (C.I.12310), Pig.Red #3 (C.I.12120), Pig.Red #4 (C.I.12085), Pig.Red #5 (C.I.12490), Pig.Red #6 (C.I.12090), Pig.Red #7 (C.I.12420), Pig.Red #8 (C.I.12355), Pig.Red #9 (C.I.12460), Pig.Red #10 (C.I.12440), Pig.Red #11 (C.I.12430), Pig.Red #12 (C.I.12385), Pig.Red #13 (C.I.12395), Pig.Red #14 (C.I.12380), Pig.Red #15 (C.I.12465), Pig.Red #16 (C.I.12500), Pig.Red #17 (C.I.12390), Pig.Red #18 (C.I.12350), Pig.Red #21 (C.I.12300), Pig.Red #22 (C.I.12315), Pig.Red #23 (C.I.12355), Pig.Red #31 (C.I.12360), Pig.Red #32 (C.I.12320), Pig.Red #95 (C.I.15897), Pig.Red #112 (C.I.12370), Pig.Red #114 (C.I.12351), Pig.Red #119 (C.I.12469), Pig.Red #146 (C.I.12485), Pig.Red #147 (C.I.12433), Pig.Red #148 (C.I.12369), Pig.Red #150 (C.I.12290), Pig.Red #151 (C.I.15890), Pig.Red #184 (C.I.12487), Pig.Red #187 (C.I.12486), Pig.Red #188 (C.I.12467), Pig.Red #210 (C.I.12474), Pig.Red #245 (C.I.12317), Pig.Red #253 (C.I.12375), Pig.Red #258 (C.I.12318) and Pig.Red #261 (C.I.12468); naphthol metal complexes, such as Pig.Red #49 (C.I.15630), Pig.Red #49:1 (C.I.15630:1), Pig.Red #49:2 (C.I.15630:2), Pig.Red #49:3 (C.I.15630:3), Pig.Red #50:1 (C.I.15500:1), Pig.Red #51:1 (C.I.15580:1), Pig.Red #53 (C.I.15585), Pig.Red #53:1 (C.I.15585:1), Pig.Red #68 (C.I.15525), Pig.Red #243 (C.I.15910) and Pig.Red #247 (C.I.15915); disazopyrazolone pigments, such as Pig.Red #37 (C.I.21205), Pig.Red #38 (C.I.21210) and Pig.Red #41 (C.I.21200); disazo condensation pigments, such as Pig.Red #144 (C.I.20735), Pig.Red #166 (C.I.20035), Pig.Red #220 (C.I.20055), Pig.Red #221 (C.I.20065) and Pig.Red #242 (C.I.20067); 2-hydroxy-3-naphthoic acid metal complexes, such as Pig.Red #48:1 (C.I.15865:1), Pig.Red #48:2 (C.I.15865:2), Pig.Red #48:3 (C.I.15865:3), Pig.Red #48:4 (C.I.15865:4), Pig.Red #48:5 (C.I.15865:5), Pig.Red #52:1 (C.I.15860:1), Pig.Red #52:2 (C.I.15860:2), Pig.Red #57:1 (C.I.15850:1), Pig.Red #58:2 (C.I.15825:2), Pig.Red #58:4 (C.I.15825:4), Pig.Red #63:1 (C.I.15880:1), Pig.Red #63:2 (C.I.15880:2), Pig.Red #64 (C.I.15800), Pig.Red #64:1 (C.I.15800:1) and Pig.Red #200 (C.I.15867); naphthalenesulfonic acid metal complexes, such as Pig.Red #60:1 (C.I.16105:1), Pig.Red #66 (C.I.18000:1) and Pig.Red #67 (C.I.18025:1); triarylcarbonium pigments, such as Pig.Red #81:1 (C.I.45160:1), Pig.Red #81:3 (C.I.45160:3) and Pig.Red #169 (C.I.45160:2); anthraquinone pigments, such as Pig.Red #89 (C.I.60745) and Pig.Red #177(C.I. 65300); thioindigo pigments, such as Pig.Red #88 (C.I.73312) and Pig.Red #181 (C.I.73360); quinacridone pigments, such as Pig.Red #122 (C.I.73915), Pig.Red #207 (C.I.73900) and Pig.Red #209 (C.I.73905); perylene pigments, such as Pig.Red #123 (C.I.71145), Pig.Red #149 (C.I.71137), Pig.Red #178 (C.I.71155), Pig.Red #179 (C.I.71130), Pig.Red #190 (C.I.71140), Pig.Red #194 (C.I.71100) and Pig.Red #224 (C.I.71127); benzimidazolone pigments, such as Pig.Red #171 (C.I.12512), Pig.Red #175 (C.I.12513), Pig.Red #176 (C.I.12515), Pig.Red #185 (C.I.12516) and Pig.Red #208 (C.I.12514); pyranthrone pigments, such as Pig.Red #216 (C.I.59710); diketopyrrolopyrrole pigments, such as Pig.Red #254 (C.I.56110); and isoindoline pigments, such as Pig.Red #260 (C.I.56295).

Examples of violet pigments suitable for use in the present invention include: triarylcarbonium pigments, such as Pig.Violet #1 (C.I.45170:2), Pig.Violet #2 (C.I.45175:1), Pig.Violet #3 (C.I.42535:2), Pig.Violet #27 (C.I.42535:3) and Pig.Violet #39 (C.I.42555:2); anthraquinone pigments, such as Pig.Violet #5:1 (C.I.58055:1); naphthol pigments, such as Pig.Violet #25 (C.I.12321) and Pig.Violet #50 (C.I.12322); quinacridone pigments, such as Pig.Violet #19 (C.I.73900); dioxazine pigments, such as Pig.Violet #23 (C.I.51319) and Pig.Violet #37 (C.I.51345); perylene pigments, such as Pig.Violet #29 (C.I.71129); and benzimidazolone pigments, such as Pig.Violet #32 (C.I.12517).

Examples of blue pigments suitable for use in the present invention include: triarylcarbonium pigments, such as Pig.Blue #1 (C.I.42595:2), Pig.Blue #2 (C.I.44045:2), Pig.Blue #9 (C.I.42025:1), Pig.Blue #10 (C.I.44040:2), Pig.Blue #14 (C.I.42600:1), Pig.Blue #18 (C.I.42770:1), Pig.Blue #19 (C.I.42750), Pig.Blue #56 (C.I.42800) and Pig.Blue #62 (C.I.44084); Cu phthalocyanine pigments, such as Pig.Blue #15 (C.I.74160) and Pig.Blue #15:1 (C.I.74160); metal-free phthalocyanine pigments, such as Pig.Blue #16 (C.I.74100); indanthrone pigments, such as Pig.Blue #60 (C.I.69800) and Pig.Blue #64 (C.I.69825); and indigo pigments, such as Pig.Blue #66 (C.I.73000) and Pig.Blue #63 (C.I.73015:x).

Examples of green pigments suitable for use in the present invention include: triarylcarbonium pigments, such as Pig.Green #1 (C.I.42040:1), Pig.Green #2 (C.I.42040:1) and Pig.Green #4 (C.I.42000:2); Cu phthalocyanine pigments, such as Pig.Green #7 (C.I.74260) and Pig.Green #36 (C.I.74265); and metal complexes, such as Pig.Green #8 (C.I.10006) and Pig.Green #10 (C.I.12775).

Examples of yellow pigments suitable for use in the present invention include: monoazo pigments, such as Pig.Yellow #1 (C.I.11680), Pig.Yellow #2 (C.I.11730), Pig.Yellow #3 (C.I.11710), Pig.Yellow #5 (C.I.11660), Pig.Yellow #6 (C.I.11670), Pig.Yellow #10 (C.I.12710), Pig.Yellow #49 (C.I.11765), Pig.Yellow #65 (C.I.11740), Pig.Yellow #73 (C.I.11738), Pig.Yellow #74 (C.I.11741), Pig.Yellow #75 (C.I.11770), Pig.Yellow #97 (C.I.11767), Pig.Yellow #98 (C.I.11727), Pig.Yellow #111 (C.I.11745), Pig.Yellow #116 (C.I.11790) and Pig.Yellow #167 (C.I.11737); monoazo metal complexes, such as Pig.Yellow #61 (C.I.13880), Pig.Yellow #62:1 (C.I.13940:1), Pig.Yellow #100 (C.I.19140:1), Pig.Yellow #168 (C.I.13960), Pig.Yellow #169 (C.I.13955) and Pig.Yellow #183 (C.I.18792); bisacetoacetarylide pigments, such as Pig.Yellow #16 (C.I.20040); diarylide pigments, such as Pig.Yellow #12 (C.I.21090), Pig.Yellow #13 (C.I.21100), Pig.Yellow #14 (C.I.21095), Pig.Yellow #17 (C.I.21105), Pig.Yellow #55 (C.I.21096), Pig.Yellow #63 (C.I.21091), Pig.Yellow #81 (C.I.21127), Pig.Yellow #83 (C.I.21108), Pig.Yellow #87 (C.I.21107:1), Pig.Yellow #113 (C.I.21126), Pig.Yellow #114 (C.I.21092), Pig.Yellow #124 (C.I.21107), Pig.Yellow #126 (C.I.21101), Pig.Yellow #127(21102), Pig.Yellow #152 (C.I.21111), Pig.Yellow #170 (C.I.21104), Pig.Yellow #171 (C.I.21106), Pig.Yellow #172 (C.I.21109) and Pig.Yellow #174 (C.I.21098); flavanthrone pigments, such as Pig.Yellow #24 (C.I.70600); diazo condensation pigments, such as Pig.Yellow #93 (C.I.20710), Pig.Yellow #94 (C.I.20038), Pig.Yellow #95 (C.I.20034), Pig.Yellow #128 (C.I.20037) and Pig.Yellow #166 (C.I.20035); anthraquinone pigments, such as Pig.Yellow #123 (C.I.65049) and Pig.Yellow #147 (C.I.60645); aldazine pigments, such as Pig.Yellow #101 (C.I.48052); naphthalenesulfonic acid metal complexes, such as Pig.Yellow #104 (C.I.15985:1); anthrapyrimidine pigments, such as Pig.Yellow #108 (C.I.68420); isoindolinone pigments, such as Pig.Yellow #109 (C.I.56284), Pig.Yellow #110 (C.I.56280), Pig.Yellow #139 (C.I.56298) and Pig.Yellow #185 (C.I.56290); benzimidazolone pigments, such as Pig.Yellow #123 (C.I.11783), Pig.Yellow #154 (C.I.13980), Pig.Yellow #175 (C.I.11784), Pig.Yellow #180 (C.I.21290) and Pig.Yellow #181 (C.I.11777); quinophthalone pigments, such as Pig.Yellow #138 (C.I.56300); and metal complexes, such as Pig.Yellow #117 (C.I.48043), Pig.Yellow #129 (C.I.48042), Pig.Yellow #150 (C.I.12764), Pig.Yellow #153 (C.I.48545), Pig.Yellow #177 (C.I.48120) and Pig.Yellow #179 (C.I.48125).

Examples of orange pigments suitable for use in the present invention include: monoazo pigments, such as Pig.Orange #1 (C.I.11725) and Pig.Orange #6 (C.I.12730); naphthol pigments, such as Pig.Orange #2 (C.I.12060), Pig.Orange #5 (C.I.12075), Pig.Orange #22 (C.I.12470), Pig.Orange #24 (C.I.12305) and Pig.Orange #38 (C.I.12367); naphthol metal complexes, such as Pig.Orange #17 (C.I.15510:1), Pig.Orange #17:1 (C.I.15510:2) and Pig.Orange #46 (C.I.15602); disazopyrazolone pigments, such as Pig.Orange #13 (C.I.21110) and Pig.Orange #34 (C.I.21115); diarylide pigments, such as Pig.Orange #15 (C.I.21130) and Pig.Orange #16 (C.I.21160); naphthalenesulfonic acid metal complexes, such as Pig.Orange #19 (C.I.15990); disazo condensation pigments, such as Pig.Orange #31 (C.I.20050); benzimidazolone pigments, such as Pig.Orange #36 (C.I.11780) and Pig.Orange #60 (C.I.11782); pyranthrone pigments, such as Pig.Orange #40 (C.I.59700); perinone pigments, such as Pig.Orange #43 (C.I.71105); quinacridone pigments, such as Pig.Orange #48 (C.I.73900); and isoindoline pigments, such as Pig.Orange #61 (C.I.11265), Pig.Orange #66 (C.I.48210) and Pig.Orange #69 (C.I.56292). These pigments can be used as a mixture of two or more thereof to produce the desired colors.

Examples of black pigments suitable for use in the present invention include mixtures of carbon black and two or more different coloring pigments.

Commercially available carbon black products are, for example: SEAST 5HIISAF-HS, SEAST KH, SEAST 3HHAF-HS, SEAST NH, SEAST 3M, SEAST 300HAF-LS, SEAST 116HMMAF-HS, SEAST 116MAF, SEASTFM-FEF-HS, SEAST SOFEF, SEAST VGPF, SEAST SVHSRF-HS and SEAST SSRF, all of which are sold by Tokai Carbon Co., Ltd.; DIAGRAM BLACK II, DIAGRAM BLACK N339, DIAGRAM BLACK SH, DIAGRAM BLACK H, DIAGRAM LH, DIAGRAM HA, DIAGRAM SF, DIAGRAM N550M, DIAGRAM M, DIAGRAM E, DIAGRAM G, DIAGRAM R, DIAGRAM N760M, DIAGRAM LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, OIL7B, OIL9B, OIL11B, OIL30B and OIL31B, all of which are sold by Mitsubishi Chemical Corp.; PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100 and LAMP BLACK-101, all of which are sold by Degussa; and RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA and RAVEN-1170, all of which are sold by Colombia Carbon Co.

Colorants that can be mixed with the carbon black products are, for example, Carmine 6B (C.I.12490) Phthalocyanine Green (C.I. 74260), Phthalocyanine Blue (C.I. 74160), Mitsubishi Carbon Black MA100, Perylene Black (BASF K0084 and K0086), Cyanine Black, Lionol Yellow (C.I.21090), Lionol Yellow GRO(C.I. 21090), Benzidine Yellow 4T-564D, Mitsubishi Carbon Black MA-40, Victoria Pure Blue (C.I.42595), C.I. PIGMENT RED 97, 122, 149, 168, 177, 180, 192, 215, C.I. PIGMENT GREEN 7 and 36, C.I. PIGMENT 15:1, 15:4, 15:6, 22, 60 and 64, C.I. PIGMENT 83 and 139, and C.I. PIGMENT VIOLET 23. A white or fluorescent pigment may also be used. Further, these colorants may be used singly or as a mixture of two or more thereof to produce a black color.

The amount of the colorant is determined depending on the required color and desired color characteristics and film characteristics. The colorant is preferably present in an amount of 2 to 15% by weight, based on the total weight of the ink composition.

A non-limiting example of the binder resin used in the ink composition of the present invention is an acrylic copolymer having ethylenically unsaturated groups.

The acrylic copolymer can be prepared by copolymerizing a monomer containing an acid group with a monomer copolymerizable therewith and reacting the copolymer resin with a reactive monomer to introduce ethylenically unsaturated groups into the copolymer resin.

The monomer containing an acid group is preferably selected from the group consisting of (meth)acrylic acid, crotonic acid, itaconic acid, maleic acid, fumaric acid, monomethyl maleic acid, isoprene sulfonic acid, and styrene sulfonic acid. These monomers may be used alone or in combination of two or more thereof.

The monomer copolymerizable with the monomer containing an acid group is preferably selected from the group consisting of styrene, chlorostyrene, α-methylstyrene, vinyltoluene, methyl (meth)acrylate, ethyl (meth)acrylate, butyl (meth)acrylate, benzyl (meth)acrylate, dimethylaminoethyl (meth)acrylate, isobutyl (meth)acrylate, t-butyl (meth)acrylate, cyclohexyl (meth)acrylate, isobornyl (meth)acrylate, 2-phenoxyethyl (meth)acrylate, tetrahydrofurfuryl (meth)acrylate, hydroxyethyl (meth)acrylate, 2-hydroxypropyl (meth)acrylate, 2-hydroxy-3-chloropropyl (meth)acrylate, 4-hydroxybutyl (meth)acrylate, acyloctyloxy-2-hydroxypropyl (meth)acrylate, ethylhexyl acrylate, 2-methoxyethyl (meth)acrylate, 3-methoxybutyl (meth)acrylate, ethoxydiethylene glycol (meth)acrylate, methoxytriethylene glycol (meth)acrylate, methoxytripropylene glycol (meth)acrylate, methoxypolyethylene glycol (meth)acrylate, phenoxydiethylene glycol (meth)acrylate, p-nonylphenoxypolyethylene glycol (meth)acrylate, p-nonylphenoxypolypropylene glycol (meth)acrylate, tetrafluoropropyl (meth)acrylate, 1,1,1,3,3,3-hexafluoroisopropyl (meth)acrylate, octafluoropentyl (meth)acrylate, heptadecafluorodecyl (meth)acrylate, tribromophenyl (meth)acrylate, methyl α-hydroxymethyl acrylate, ethyl α-hydroxymethyl acrylate, propyl α-hydroxymethyl acrylate and butyl α-hydroxymethyl acrylate. These monomers may be used alone or in combination of two or more thereof.

The reactive monomer used to introduce ethylenically unsaturated groups into the copolymer resin is preferably selected from the group consisting of glycidyl (meth)acrylate, vinylbenzyl glycidyl ether, vinyl glycidyl ether, allyl glycidyl ether, 4-methyl-4,5-epoxypentene, γ-glycidoxypropyltrimethoxysilane, γ-glycidoxypropylmethyldiethoxysilane, γ-glycidoxypropyltriethoxysilane, and norbornyl derivatives. These reactive monomers may be used alone or in combination of two or more thereof.

The acid value of the acrylic copolymer having ethylenically unsaturated groups is preferably in the range of 0 to 200 KOH mg/g. Ink compositions for use in roll printing do not need to undergo alkali development, unlike photoresists for use in photolithography. Therefore, the binder resin is not necessarily required to have an acid value above zero. Meanwhile, if the acid value of the resin exceeds 200 KOH mg/g (i.e. the number of the ethylenically unsaturated groups decreases), the degree of cure of the resin by crosslinking drops. The acrylic copolymer used binder resin preferably has a weight average molecular weight in the range of 1,000 to 200,000 and more preferably 3,000 to 30,000.

In view of fundamental physical properties (e.g., heat stability and chemical resistance) required in a color filter pattern, viscosity of the composition, uniformity of a film upon coating, and intended color characteristics, it is preferable to adjust the content of the binder resin in the ink composition to 1 to 20% by weight.

As the polyfunctional monomer, there can be used a compound having at least one unsaturated group capable of addition polymerization in the molecule and having a boiling point of at least 100° C., or a caprolactone-modified functional monomer.

The compound having at least one unsaturated group capable of addition polymerization in the molecule and having a boiling point of at least 100° C. may be, for example: a monofunctional monomer, such as polyethylene glycol mono (meth)acrylate, polypropylene glycol mono(meth)acrylate or phenoxyethyl (meth)acrylate; or a polyfunctional monomer, such as polyethylene glycol (meth)acrylate, polypropylene glycol (meth)acrylate, trimethylolethane triacrylate, trimethylolpropane triacrylate, neopentyl glycol (meth)acrylate, pentaerythritol tetraacrylate, pentaerythritol triacrylate, dipentaerythritol pentaacrylate or dipentaerythritol hexaacrylate. The caprolactone-modified polyfunctional monomer may be, for example, KAYARAD DPCA-20, 30, 60, 120 introduced into dipentaerythritol, KAYARAD TC-110S introduced into tetrahydrofuryl acrylate, or KAYARAD HX-220 or KAYARAD HK-620 introduced into neopentyl glycol hydroxypivalate.

Other examples of polyfunctional monomers suitable for use in the present invention include epoxy acrylates of bisphenol A derivatives, novolac-epoxy acrylates, and urethane-based polyfunctional acrylates, such as U-324A, U15HA and U-4HA. These polyfunctional monomers may be used alone or as a mixture of two or more thereof.

In view of the strength of a final coating film and an ink resin layer, it is preferable to limit the amount of the polyfunctional monomer to 1 to 30% by weight with respect to the total weight of the ink composition.

The initiator used in the ink composition of the present invention is an azo compound as a thermal polymerization initiator. Examples of azo compounds suitable for use in the present invention include, but are not limited to: azonitrile compounds, such as V-60, V-65, V-59, V-70 and V-40; azo ester compounds, such as V-601; azoamide compounds, VA-086, VA-085, VA-080, Vam-110, Vam-111 and VF-096; azoamidine compounds, such as V-50, VA-044, VA-046B, Aam-027, VA-060, VA-057 and VA-061; and macroazo initiators, such as VPS-0501, VPS-1001, VPE-0201, VPE-0401, VPE-0601 and VPTG-0301, all of which are commercially available from Wako Pure Chemical Industries Ltd.

The thermal polymerization initiator is preferably present in an amount of 0.1 to 5.0% by weight, based on the total weight of the ink composition.

Optionally, the ink composition of the present invention may further comprise at least one additive selected from a surfactant, a curing accelerator, a thermal polymerization inhibitor, a plasticizer, an adhesion promoter and a filler. The additive is present in an amount ordinarily used by those skilled in the art.

As the surfactant, a silicone- or fluorine-based surfactant can be used. Specific examples of the silicone-based surfactant include, but are not limited to: products commercially available from BYK-Chemie under the trademarks BYK-077, BYK-085, BYK-300, BYK-301, BYK-302, BYK-306, BYK-307, BYK-310, BYK-320, BYK-322, BYK-323, BYK-325, BYK-330, BYK-331, BYK-333, BYK-335, BYK-341v344, BYK-345v346, BYK-348, BYK-354, BYK-355, BYK-356, BYK-358, BYK-361, BYK-370, BYK-371, BYK-375, BYK-380 and BYK-390. Specific examples of the fluorine-based surfactant include, but are not limited to: products commercially available from DaiNippon Ink & Chemicals (DIC) under the trademarks F-114, F-177, F-410, F-411, F-450, F-493, F-494, F-443, F-444, F-445, F-446, F-470, F-471, F-472SF, F-474, F-475, F-477, F-478, F-479, F-480SF, F-482, F-483, F-484, F-486, F-487, F-172D, MCF-350SF, TF-1025SF, TF-1117SF, TF-1026SF, TF-1128, TF-1127, TF-1129, TF-1126, TF-1130, TF-1116SF, TF-1131, TF1132, TF1027SF, TF-1441 and TF-1442.

The present invention also provides a cured product of the ink composition. The cured product may be a red, green, blue or black matrix pattern for a color filter.

The present invention also provides a display device which comprises a color filter including the color or black matrix pattern.

MODE FOR INVENTION

Hereinafter, the present invention will be explained in more detail with reference to the following examples. However, these examples are given for the purpose of illustration and are not intended to limit the scope of the invention.

EXAMPLES

Example 1

The following components were mixed together with stirring for 5 hours to prepare a blue ink composition for roll printing. The contents of the components are expressed as parts by weight with respect to 100 parts by weight of the ink composition.

Colorants: 3.76 parts by weight of a blue pigment (Pig. Blue #15:6) and 0.94 parts by weight of a violet pigment (Pig. Violet #23)

Binder resin: 6.24 parts by weight of a polymer ($M_w$=9,000, A.V. 90) prepared by addition polymerization of a benzyl (meth)acrylate/(meth)acrylic acid (70:30 (mol/mol)) copolymer and allyl glycidyl ether Functional monomer: 9.4 parts by weight of dipentaerythritol hexaacrylate Thermal polymerization initiator: 0.5 parts by weight of an azoamide (V-40, Wako Pure Chemical Industries Ltd.)

Additives: 1.616 parts by weight of a polyester dispersant, 0.1 parts by weight of 3-methacryloxypropyltrimethoxysilane, 0.1 parts by weight of a first surfactant (F-475, DaiNippon Ink & Chemicals) and 0.2 parts by weight of a second surfactant (F-487, DaiNippon Ink & Chemicals)

Solvent system: 37.014 parts by weight of propylene glycol monomethyl ether acetate, 24.169 parts by weight of methoxy propanol, and 15.961 parts by weight of acetone.

Example 2

A blue ink composition for roll printing was prepared in the same manner as in Example 1 except that 24.169 parts by weight of ethoxy propanol was used as a solvent instead of methoxy propanol.

Example 3

The following components were mixed together with stirring for 5 hours to prepare a red ink composition for roll printing. The contents of the components are expressed as parts by weight with respect to 100 parts by weight of the ink composition.

Colorants: 3.76 parts by weight of a red pigment (Pig. Red #254), 1.731 parts by weight of a red pigment (Pig. Red #177), and 1.212 parts by weight of a yellow pigment (Pig. Yellow #150)

Binder resin: 4.177 parts by weight of a polymer ($M_w$=9,000, A.V. 90) prepared by addition polymerization of a benzyl (meth)acrylate/(meth)acrylic acid (70:30 (mol/mol)) copolymer and allyl glycidyl ether Functional monomer: 3.337 parts by weight of dipentaerythritol hexaacrylate Thermal polymerization initiator: 0.7 parts by weight of an azoamide (V-40, Wako Pure Chemical Industries Ltd.)

Additives: 2.692 parts by weight of a polyester dispersant, 0.146 parts by weight of 3-methacryloxypropyltrimethoxysilane, 0.15 parts by weight of a first surfactant (F-475, DaiNippon Ink & Chemicals) and 0.15 parts by weight of a second surfactant (F-487, DaiNippon Ink & Chemicals)

Solvent system: 56.184 parts by weight of propylene glycol monomethyl ether acetate and 25.479 parts by weight of methoxy propanol

Example 4

A red ink composition for roll printing was prepared in the same manner as in Example 3 except that 10.0 parts by weight of methoxy propanol and 15.479 parts by weight of ethoxy propanol were used as solvents instead of 25.479 parts by weight of methoxy propanol.

Comparative Example 1

A blue ink composition for roll printing was prepared in the same manner as in Example 1 except that 32.169 parts by weight of methyl ethyl ketone and 7.961 parts by weight of ethyl acetate were used as solvents instead of methoxy propanol and acetone.

Comparative Example 2

A blue ink composition for roll printing was prepared in the same manner as in Example 1 except that 20.2 parts by weight of dipropylene glycol monomethyl ether and 19.93 parts by weight of 3-methoxybutyl acetate were used as solvents instead of methoxy propanol and acetone.

Comparative Example 3

A red ink composition for roll printing was prepared in the same manner as in Example 3 except that 20.2 parts by weight of methyl ethyl ketone and 5.279 parts by weight of ethyl acetate were used as solvents instead of methoxy propanol.

Comparative Example 4

A red ink composition for roll printing was prepared in the same manner as in Example 3 except that 15.2 parts by weight of dipropylene glycol monomethyl ether and 10.279 parts by weight of 3-methoxybutyl acetate were used as solvents instead of methoxy propanol.

The physical properties of the ink compositions prepared in Examples 1-4 and Comparative Examples 1-4 were measured in accordance with the following procedures. The results are shown in Table 2.

The average absorption rate and average evaporation rate of the solvents contained in each of the compositions were calculated by substituting absorption rates and evaporation rates of the solvents, which were calculated by Equations 1 and 2, respectively, into Equations 3 and 4:

$$\overline{V} = \Sigma V_i f_i \quad (3)$$

$$\overline{A} = \Sigma A_i f_i \quad (4)$$

wherein $V_i$ and $A_i$ represent the evaporation rate and absorption rate of the solvent i contained in the ink, respectively, and $f_i$ is the weight percent of the solvent i with respect to the total weight of all solvents.

Blanket coatability: Each of the ink compositions was coated on a PDMS layer of a blanket using a coater. The coatability of the ink composition was defined to be 'good' when no pinholes were observed, and 'poor' when several pinholes were observed over the entire surface of the coated area.

Waiting time: Each of the ink compositions was coated on a PDMS layer of a blanket using a coater. At this time, the solvents must be evaporated to an optimum level of dryness in order to completely remove unwanted portions of the pattern over the entire surface of the coated area by using a cliché and transfer the desired portions of the pattern to a substrate. The time needed to dry the ink composition coated on the blanket to an optimum level after coating in order to transfer the overall pattern to the substrate is defined as a 'waiting time'. When the waiting time was shorter than 70 sec, the ink composition was judged to be 'good'. The pattern was not perfectly transferred from the coated ink to the substrate prior to the optimum waiting time because the ink was not sufficiently dried. Meanwhile, when the ink was dried for a time longer than the optimum waiting time, the ink was completely hardened, and as a result, no pattern transfer occurred.

Pattern transferability: Each of the ink compositions was coated on a PDMS layer of a blanket using a coater, followed by drying for the optimum waiting time. Unwanted portions of the pattern were removed by using a cliché and the desired portions of the pattern remaining on the blanket were transferred to a substrate. At this time, when the desired portions of the pattern over the entire surface of the coated area were perfectly transferred to the substrate, the pattern transferability was defined to be 'good'.

Blanket swelling: After the pattern was perfectly transferred from the ink coated on the blanket to the substrate, the surface of the blanket swollen by the solvents of the ink and a variation in the thickness of the blanket were visually observed.

TABLE 2

| Properties | Blanket coatability | Average absorption rate (mg/cm² · min) | Average evaporation rate (mg/cm² · min) | Waiting time (Sec) | Pattern transferability | Blanket swelling |
|---|---|---|---|---|---|---|
| Example 1 | Good | 2.324 | 0.706 | 60 | Good | Slight |
| Example 2 | Good | 2.725 | 0.68 | 70 | Good | Slight |
| Example 3 | Good | 2.61 | 0.123 | 60 | Good | Slight |
| Example 4 | Good | 2.853 | 1.078 | 40 | Good | Slight |
| Comparative Example 1 | Good | 5.831 | 0.722 | 30 | Good | Severe |
| Comparative Example 2 | Good | 2.553 | 0.056 | 300 | Good | Slight |
| Comparative Example 3 | Good | 4.877 | 2.753 | 10 | Good | Severe |
| Comparative Example 4 | Good | 2.955 | 0.074 | 240 | Good | Slight |

As can be seen from the results in Table 2, the ink compositions of Examples 1-4 having an average absorption rate of less than 3.412 mg/cm²·min and an average evaporation rate of more than 0.1 mg/cm²·min showed good pattern transferability in a waiting time as short as 70 sec. In addition, the ink compositions of Examples 1-4 were observed to cause very slight blanket swelling.

In contrast, the ink compositions of Comparative Examples 1 and 3 having very high average evaporation rates (~0.72 mg/cm$^2$·min and ~2.75 mg/cm$^2$·min, respectively) had short waiting times of 30 sec and 10 sec, respectively, but were observed to cause severe blanket swelling due to their very high average absorption rates (~5.83 mg/cm$^2$·min and ~4.88 mg/cm$^2$·min, respectively). Although the ink compositions of Comparative Examples 2 and 4 caused only slight blanket swelling due to their relatively low average absorption rates (~2.55 mg/cm$^2$·min and ~2.96 mg/cm$^2$·min, respectively), the waiting times were considerably lengthened (300 sec and above 240 sec, respectively) due to their low average evaporation rates (~0.056 mg/cm$^2$·min and ~0.074 mg/cm$^2$·min, respectively).

In conclusion, an ink suitable for use in roll printing is required to have an average evaporation rate of at least 0.1 mg/cm$^2$·min in order to shorten the waiting time of the ink after coating, which is necessary to obtain good pattern transferability. In addition, the ink must have an average absorption rate of less than 3.412 mg/cm$^2$·min to minimize swelling of a blanket after pattern transfer.

The invention claimed is:

1. A roll printing ink composition for transferring a pattern on a substrate of a display device, comprising:
   2 to 15% by weight of a colorant, 1 to 20% by weight of a binder resin, 1 to 30% by weight of a polyfunctional monomer having at least one ethylenically unsaturated double bond, 0.1 to 5% by weight of an initiator, 50 to 90% by weight of a solvent system, and the residual of an additive;
   wherein the solvent system has an evaporation rate ($V_t$) of at least 0.1 mg/cm$^2$-min and an absorption rate ($S_t$) into a blanket of less than 3.412 mg/cm$^2$-min, as calculated by Equations 1 and 2, respectively:

$$V_t = \frac{W_t}{A \times t} \quad (1)$$

where $W_t$(mg) is the weight loss of the solvent, A(cm$^2$) is the area of a glass dish, and t(min) is the time when the solvent is left in air; and $$S_t = \frac{W_t - W_0}{A_0 \times t} \quad (2)$$

where $W_0$(mg) and $W_t$(mg) are the initial and final weights of a polydimethyl-siloxane (PDMS) rubber layer measured before and after the PDMS rubber layer is dipped in the solvent for a given time (t) respectively, $A_0$(cm$^2$) is the initial surface area of the PDMS rubber layer, and t(min) is the dipping time of the PDMS rubber layer.

2. The ink composition according to claim 1, wherein the solvent system is a mixture of two or more selected from the group consisting of propylene glycol monomethyl ether acetate, acetone, 1-methoxy-2-propanol, 1-ethoxy-2-propanol, cyclohexanone, dimethyl carbonate, and mixtures thereof.

3. The ink composition according to claim 1, further comprising a solvent with an evaporation rate of less than 0.1 mg/cm$^2$-min in an amount of 30% by weight or less with respect to the total weight of all solvents.

4. The ink composition according to claim 1, further comprising a solvent with an absorption rate of at least 3.412 mg/cm$^2$-min in an amount of 30% by weight or less with respect to the total weight of all solvents.

5. The ink composition according to claim 1, wherein the binder resin is an acrylic copolymer having ethylenically unsaturated groups prepared by copolymerizing a monomer containing an acid group with a monomer copolymerizable therewith and reacting the copolymer resin with a reactive monomer to introduce ethylenically unsaturated groups into the copolymer resin.

6. The ink composition according to claim 1, wherein the binder resin has an acid value of 0 to 200 KOH mg/g and a weight average molecular weight of 1,000 to 200,000.

7. The ink composition according to claim 1, wherein the polyfunctional monomer is a compound having at least one unsaturated group capable of addition polymerization in the molecule and having a boiling point of at least 100° C., or a caprolactone-modified functional monomer.

8. The ink composition according to claim 1, wherein the initiator is an azo compound as a thermal polymerization initiator.

9. A color pattern formed using the ink composition according to claim 1.

10. A color filter comprising the color pattern according to claim 9.

11. A display device comprising the color filter according to claim 10.

12. A black matrix pattern formed using the ink composition according to claim 1.

13. A color filter comprising the black matrix pattern according to claim 12.

14. A display device comprising the color filter according to claim 13.

* * * * *